Nov. 6, 1923.
W. F. C. DEVLIN ET AL
1,473,088
CAMERA LOCK FOR PREVENTING DOUBLE EXPOSURE
Filed Nov. 10, 1921
3 Sheets-Sheet 1
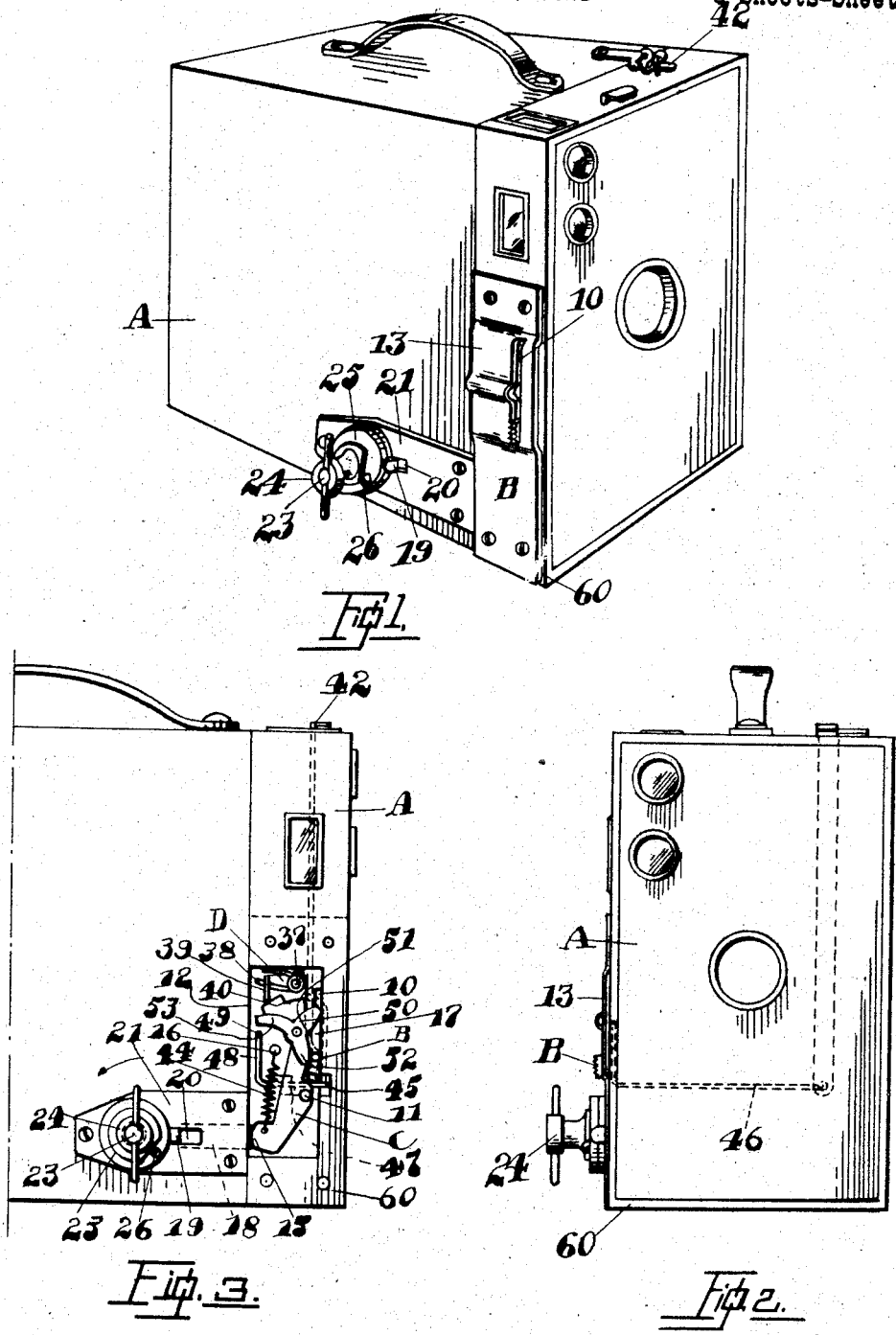
INVENTORS
WILLIAM. F. C. DEVLIN.
SIDNEY. W. GRAHAM.
BY *Johnston Laughlin Co*
ATTYS.

Nov. 6, 1923.    1,473,088
W. F. C. DEVLIN ET AL
CAMERA LOCK FOR PREVENTING DOUBLE EXPOSURE
Filed Nov. 10, 1921.    3 Sheets-Sheet 2
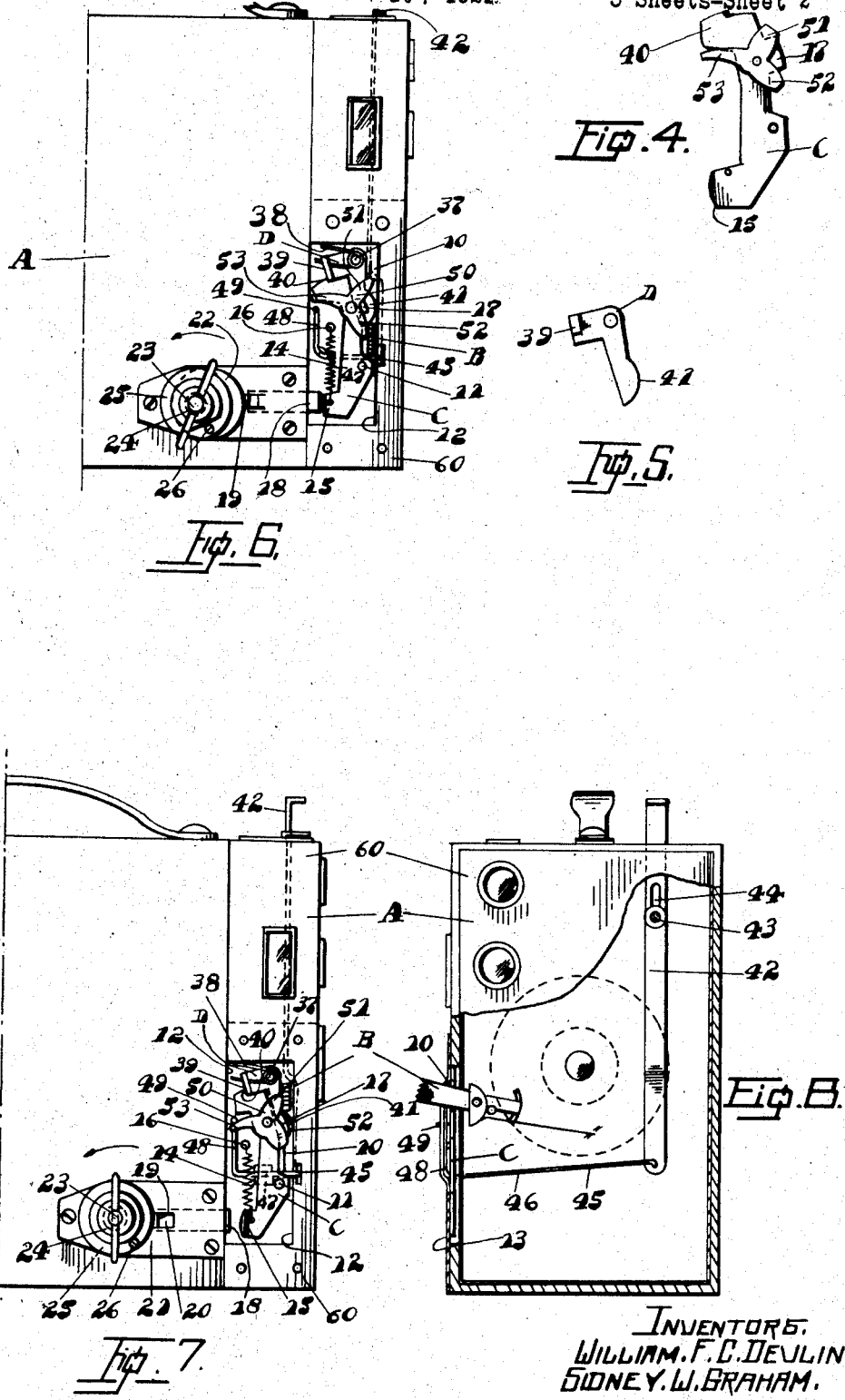

Nov. 6, 1923.
1,473,088
W. F. C. DEVLIN ET AL
CAMERA LOCK FOR PREVENTING DOUBLE EXPOSURE
Filed Nov. 10, 1921
3 Sheets-Sheet 3
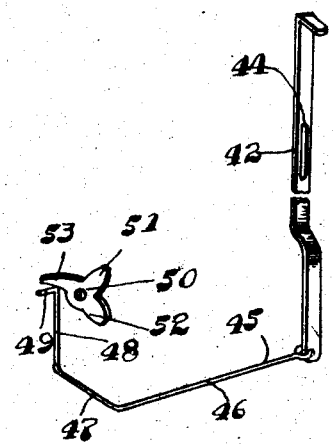
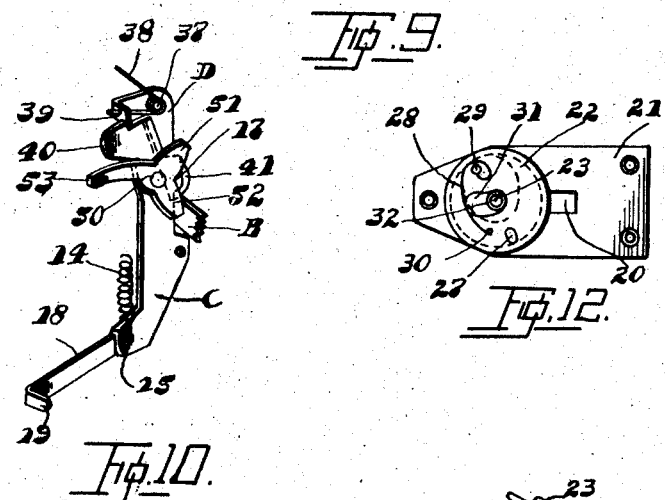
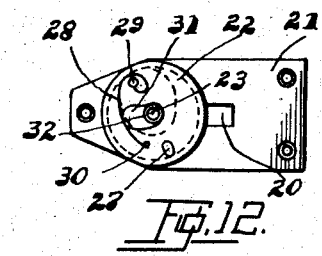
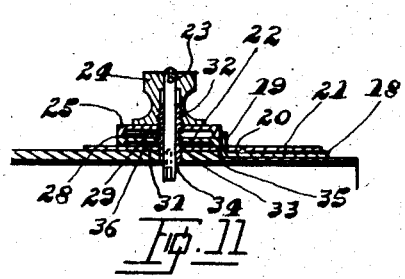
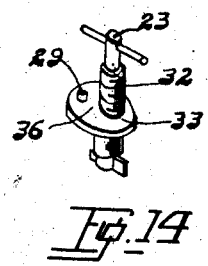
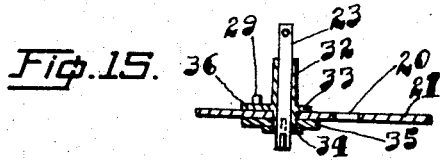
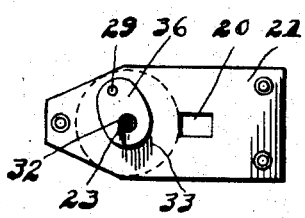
INVENTORS.
WILLIAM. F.C. DEVLIN.
SIDNEY. W. GRAHAM.

Patented Nov. 6, 1923.

1,473,088

UNITED STATES PATENT OFFICE.

WILLIAM FRANCIS CUMNOR DEVLIN AND SIDNEY WALKER GRAHAM, OF OTTAWA, ONTARIO, CANADA; SAID GRAHAM ASSIGNOR TO SAID DEVLIN.

CAMERA LOCK FOR PREVENTING DOUBLE EXPOSURE.

Application filed November 10, 1921. Serial No. 514,413.

*To all whom it may concern:*

Be it known that we, WILLIAM FRANCIS CUMNOR DEVLIN and SIDNEY WALKER GRAHAM, both subjects of the King of Great Britain, and both residents of the city of Ottawa, in the Province of Ontario and Dominion of Canada, have invented certain new and useful Improvements in Camera Locks for Preventing Double Exposure, of which the following is a specification.

This invention relates to improvements in camera locks for preventing double exposure, particularly to that type of lock which is applicable to a camera whether of the box or folding type, in which the shutter is controlled both for instantaneous and time exposures by an oscillatory shutter control lever, which lever is usually operated from one side to the other for instantaneous exposure and from one side to the other and back for a time exposure; and the general objects of the invention are to provide a simple and effective device of this character which may be applied to existing types of cameras without change in the shutter control mechanism and by means of which it may be possible to guard against double exposures whether instantaneous or time exposures are made.

Further objects of the invention are to generally improve and simplify the construction of the device and to enable the working parts to better perform the functions required of them.

And it consists essentially of the improved combination and arrangement of parts hereinafter described in detail in the accompanying specifications and drawings.

In the drawings:

Figure 1 is a perspective view of an embodiment of the invention.

Figure 2 is a front elevation of the same.

Figure 3 is a side view with the cover plate of the operating mechanism removed showing the parts in locked position.

Figure 4 is a plan view of the primary latch lever.

Figure 5 is a plan view of the secondary latch lever.

Figure 6 is a side elevation, showing the parts of Figure 3 in operating or released position.

Figure 7 is a side view as in Figure 3, showing the position of the parts during operation of the shutter control lever for a time exposure.

Figure 8 is a front sectional elevation.

Figure 9 is a perspective view of the regulating mechanism for time exposure.

Figure 10 is a perspective detail of the principal operating parts.

Figure 11 is a sectional detail of a portion of the film winding mechanism and the connecting levers thereto.

Figure 12 is a detail in plan of the cam on the film winding mechanism.

Figure 13 is a detail in plan of the eccentric for operating the cam on the film winding mechanism.

Figure 14 is a perspective view of the film winding rod.

Figure 15 is a sectional elevation through the film winding rod.

In the drawings like characters of reference indicate corresponding parts in all the figures.

Referring to the drawings:

A indicates a camera which may be of any suitable or desired type, the mechanism hereinafter described being designed to be applied to existing camera without alteration of the shutter control lever, and, while the mechanism is, in the present case, shown as applied to a box cabinet, it is evident that with slight modifications, it may be applied to a folding camera of another type. B indicates the oscillatory lever which, in the type of camera illustrated, is designed to control the shutter mechanism, the means by which the shutter is controlled forming no part of the present invention and not, therefore, being herein described.

In this type of camera, the movement of the shutter control lever from one side to the other of its slot 10 is designed to operate the shutter for instantaneous exposure whereas, when a time exposure is desired, the lever is operated from one side to the other and back. The present invention provides latch mechanism controlled by the film winding means, through which operation of the oscillating lever is prevented until the film winding mechanism is operated. This mechanism includes a primary latch lever C pivoted on a pin 11 conveniently mounted in a recess 12 formed in the side of the camera and which may be covered by a cover plate 13.

The latch lever C is spring actuated by means of a spring 14 extending from a projection 15 on the lever to a pin 16 on the camera casing, the spring normally tending to move the latch lever to engaged position, in which the locking projection 17 extends adjacent to and across the path of the shutter control lever B and prevents operation of the same; this projection being of such width that one side of it will engage adjacent to the shutter control lever when at one end of the slot, and the other side will engage the opposite side of the lever when at the opposite end of the slot.

The primary latch lever C is designed to be moved to disengaged or released position by means of a sliding rod 18 suitably mounted on the side of the camera with freedom to slide longitudinally, and having an out-turned end 19 projecting in a slot 20 in the plate 21 attached to the side of the camera, this projecting end being designed to be engaged and operated by a cam 22 which extends about the rod 23 of the film winding mechanism this rod having a nut 24 thereon by which it is turned and having its lower end designed to engage the reel of the film in the manner well known in the art. The bottom part of the nut 24 is connected to a disc 25 provided with a pin 26 projecting into a short radial slot 27 in the cam 22.

The cam 22 is retained in normal position substantially concentric with the disc 25 by means of a flat spring 28 which extends from a pin 29 on an eccentric 36 to a pin 30 on the cam 22. The pin 29 extends through the cam 22, and it is about this pin that the cam turns, provision being made for this by the slot 27 which permits movement of the pin 26 and by a central arcuate slot 31 which surrounds the sleeve 32 mounted on the pin 23 and turning therewith, the sleeve being formed with flanges 33 and 34 extending above and below the plate 21, a washer 35 being provided between the flange 34 and the underside of the plate 21. The eccentric 36 is secured to or formed integral with the sleeve 32 and rotates therewith.

It will be seen that the operation of this part of the mechanism is as follows: When the thumb nut 24 is turned in an anti-clockwise direction to wind the film, the pin 26 carried by the disc 25 will engage and swing the cam 22 about the pin 29, causing it to project outwardly (as shown in Figure 6), in which position it will engage the projection 19 and force the rod 18 towards the latch lever C, moving the same to released position. As soon as the pressure exerted in turning the thumb nut is relieved, the spring 28 will return the cam to normal position. It will be seen further that, if the thumb nut is turned in a clockwise direction, the cam will not be forced outwardly because the slot 31 will not permit the movement outwardly of the cam in the opposite direction.

The primary latch lever C is adapted to be held in retroactive position by a secondary latch lever D pivoted to a pin 37 on the camera casing within the recess 12 and being spring-held in engaged position by a spring 38, the extremities of which engage the side of the recess 12 and the latch lever respectively, the central spirally wound portion of the spring extending around the pin 37. The connection between the primary latch lever and the secondary lever is effected by a projection 39 turned upwardly on the secondary latch lever D, and designed to engage a tooth 40 formed at the end of the primary latch lever, the secondary latch lever being in the nature of a bell crank, and the projection 39 being on one arm of the bell crank, while the opposite arm of the bell crank is formed with a cam surface 41 designed to be engaged by the latch lever B in its movement so that, as the latch lever is moved from one side to the other, it will engage the cam surface 41 and move the secondary latch lever to such position that it releases the primary latch lever C and causes the same to move to engaged or set position under operation of the spring 14. In this way the shutter control lever is ordinarily locked after each operation, and this is the action which takes place when the camera is used for instantaneous exposures, release being only effected when the film winding mechanism is operated whereby a double exposure is prevented.

To provide for taking of time exposures, regulating means are provided adapted to prevent locking of the shutter operating mechanism until it is moved from one side to the other and back again. These means include a longitudinally slidable rod 42 suitably mounted in its casing and retained in its movement by means of a pin 43 which extends in a longitudinal slot 44 in the rod 42. The end of the rod is connected to one arm 45 of a crank 46 which has an intermediate portion 47 journaled in the casing. The other arm 48 of the crank carries a detent 49 which, under operation of the rod 42, is designed to be moved into the path of a pivoted controlling lever 50 which is pivotally mounted on the primary latch lever C. This control lever is formed with diverging arms 51 and 52 having their edges in the nature of cam surfaces, and its position on the latch lever is such that, when the end 53 is engaged by the detent 49, the primary latch lever will be held from springing to engaged position until the shutter control lever has been moved from one side to the other and back again.

The way in which this operation takes place is as follows: Assuming the detent 49 is in operative position (as shown in Figure 7), the lever B being at the upper end of the slot, after the lever B moves towards the lower end of the slot, it will first release the secondary latch lever D which will ordinarily permit the primary latch lever to spring to engaged position. Before this takes place, however, the lever B will engage the cam surface on the arm 52 and will remain in engagement with this surface while moving to the end of the slot. As the shutter control lever B is moved upwardly again, it will finally pass the arm 52, and the primary latch lever C will again spring to engaged position.

By reason of the fact that two arms 51 and 52 are provided, this mechanism is free to operate in the manner described whether the shutter control lever is operated first from the bottom or the top of the slot. As above described, it is operated from the top. Assuming that when a time exposure is to be made, the shutter control lever B is at the bottom, then, on moving it upwardly, it will first engage the secondary latch lever D and release the same, but the primary latch lever will be prevented from springing to engaged position by the cam surface on the arm 51 engaging the lever B while the detent 49 holds the arm 53 on the downward movement of the shutter control lever B. As soon as the arm 51 is passed, the primary latch lever may spring to engaged position.

It will thus be seen that we have provided a device which operates either for instantaneous or for time exposures, and which is also operable whether the shutter control lever is operated from the top or bottom of its slot. The device is such that the operating parts may be readily included in the removable front section 60 of the camera, the film winding mechanism and the rod 18 being alone carried on the body part of the camera.

It will be seen further that the shutter operating mechanism in the camera is in no way interfered with, and the device may be applied to existing cameras by simply adding thereto the latch mechanisms and the regulating mechanism above described.

It will further be noted that, when the device is set for instantaneous exposures through the regulating mechanism, nothing but instantaneous exposures can be taken, and conversely when set for time exposures, only time exposures may be taken.

As many changes could be made in the above construction and many apparently widely different embodiments of our invention within the scope of the claims, constructed without departing from the spirit or scope thereof, it is intended that all matter contained in the accompanying specification and drawings shall be interpreted as illustrative and not in a limiting sense.

What we claim as our invention is:

1. A device of the character described comprising in combination, an oscillatory shutter control lever adapted to be moved in a certain way to effect instantaneous exposure, and, to be moved in another way, to effect time exposure, film winding means, and means for preventing operation of the shutter control lever until after the film winding mechanism has been operated when the shutter control lever is operated for instantaneous exposure as well as when it is operated for a time exposure, the said means including a cam operated by the film winding device, and a latch device operated by the cam and engaging the shutter control lever.

2. In a device of the character described and in combination, an oscillatory shutter control lever adapted to be oscillated from one side to the other for instantaneous exposure and from one side to the other and back for time exposure, film winding mechanism, regulating mechanism for the shutter control lever by which it is permitted to oscillate the proper amount for instantaneous or time exposure, respectively, and means operated by the film winding mechanism and co-operating with the regulating mechanism to prevent operation of the shutter control lever after each exposure in the case either of instantaneous or time exposure until the film winding mechanism has been operated.

3. In a device of the character described and in combination, a pivoted shutter control lever, a primary latch device adapted when set to prevent operation of the shutter control lever, a secondary latch device adapted to retain the primary latch device in disengaged position, the said secondary latch device being adapted to be engaged and released by the shutter control lever in its movement, film winding mechanism, and means operated by the film winding mechanism for releasing the primary latch device and causing it to be engaged and held by the secondary latch device in released position.

4. In a device of the character described and in combination, a pivoted shutter control lever, a primary latch device adapted when set to prevent operation of the shutter control lever, a secondary latch device adapted to retain the primary latch device in disengaged position, the said secondary latch device being adapted to be engaged and released by the shutter control lever in its movement, film winding mechanism for releasing the primary latch device, the said means comprising a cam, and a slide operated by the cam adapted to engage the latch device.

5. In a device of the character described and in combination, a pivoted shutter control lever, a primary latch device adapted when set to prevent operation of the shutter control lever, a secondary latch device adapted to retain the primary latch device in disengaged position, the said secondary latch device being adapted to be engaged and released by the shutter control lever in its movement, film winding mechanism, and means operated by the film winding mechanism for releasing the primary latch device and causing it to be engaged and held by the secondary latch device in released position, and means preventing operation of the secondary latch device by the shutter control lever until the shutter control lever has moved from one side to the other and back again to its original position, the said last-mentioned means comprising a detent member and a pivoted engaging member mounted on the primary latch device and adapted to engage the shutter control lever and prevent setting of the primary latch device.

6. A device of the character described comprising an oscillatory shutter control lever adapted to be operated from one side to the other for instantaneous exposure and from one side to the other and back for time exposure, film winding mechanism, a latch device controlled by the film winding mechanism adapted to prevent operation of the shutter control lever from one side to the other until after the film winding device is operated, and regulating means for time exposure adapted to engage the latch device and prevent operation of the same when the lever has been moved from one side to the other whereby the said lever may be moved from one side to the other and back when the regulating mechanism is set for a time exposure.

7. A device of the character described comprising an oscillatory shutter control lever adapted to be operated from one side to the other for instantaneous exposure and from one side to the other and back for time exposure, film winding mechanism, a latch device controlled by the film winding mechanism adapted to prevent operation of the shutter control lever from one side to the other until after the film winding device is operated, and regulating means for time exposure adapted to engage the latch device and prevent operation of the same when the lever has been moved from one side to the other whereby the said lever may be moved from one side to the other and back when the regulating mechanism is set for a time exposure, the said last-mentioned means comprising a slidable detent, and a pivoted lever having arms extending in opposite directions and adapted to engage the shutter control lever and prevent engagement of the latch device.

8. A device of the character described comprising an oscillatory shutter control lever adapted to be moved from one side to the other for instantaneous exposure and from one side to the other and back for time exposure, a pivoted spring actuated primary latch device tending normally to prevent operation of the shutter control lever, film winding mechanism, means actuated by the film winding mechanism for moving the primary latch device to released position, a pivoted spring actuated secondary latch device having means to engage the primary latch device and hold it in released position, the said secondary latch device being adapted to be engaged and released by the shutter control lever, a pivoted lever on the primary latch device having arms extending in opposite directions and adapted to engage the shutter control lever, a slidable detent co-operating with the aforesaid pivoted lever adapted when a determined position is reached to move the lever in such a way as to cause one of the arms to engage the shutter control lever and prevent return of the primary latch device to engaged position the said detent being released by operation of the film winding mechanism.

9. A device of the character described comprising a camera having a main body portion and removable front portion, film winding mechanism on the main body portion, an oscillatory shutter control lever on the removable portion adapted to be moved in a certain way to effect instantaneous exposures and adapted to be moved in another way to effect time exposures, and means for preventing operation of the shutter control lever until after the film winding mechanism has been operated, the said means including separable mechanism partly mounted on the main portion and partly on the removable portion of the camera.

10. In a device of the character described, a rotary film winding member, a reciprocable member operated thereby, a shutter control member, a primary latch device controlling the shutter control member and adapted to be released by the reciprocable member, a secondary latch device adapted to hold the primary latch device in disengaged position and adapted to be released by the shutter control member.

11. A device of the character described comprising a two-part camera, a shutter control member on one part, a film winding member on the other part, a latch device adapted to prevent successive operation of the shutter control member and being mounted on the same part of the camera as the shutter control member, a reciprocable member mounted on the same part as the film winding device and reciprocated thereby adapted to engage and release the latch device.

12. In a device of the character described, a rotary film winding member, an eccentrically pivoted cam member rotating therewith and adapted to be moved outwardly therefrom when rotated in one direction but not when in the other, a reciprocable member actuated by the cam when moved outwardly, a shutter control member, and a latch device controlling the shutter control member adapted to be released by the reciprocable member.

13. A device of the character described comprising a rotary film winding member, an eccentric pivot carried thereby, a cam mounted on the pivot having limited movement on the same, means carried by the rotary film winding member adapted to cause the cam to be moved outwardly, a reciprocable member operated by the cam when moved outwardly, a shutter control member, and a latch device controlling the shutter control member and adapted to be released by the reciprocable member.

14. A device of the character described comprising a rotary film winding member, an eccentric pivot carried thereby, a cam mounted on the pivot having limited movement on the same, means carried by the rotary film winding member adapted to cause the cam to be moved outwardly, a reciprocable member operated by the cam when moved outwardly, a shutter control member, a latch device controlling the shutter control member and adapted to be released by the reciprocable member, and spring means for returning the cam to normal position.

15. A device of the character described comprising a rotary film winding member, an eccentric carried thereby having a pin thereon, a cam pivoted to the pin having a central slot through which the film winding member extends and by which the movement of the cam is limited, a second slot in the cam, a pin carried by the film winding member and engaging in the second slot, a shutter control member, and controlling means for the movement of the shutter control member controlled by the movement of the cam.

16. A device of the character described comprising an oscillatory shutter control lever, a primary latch device having a projection adapted to extend on opposite sides of the shutter control lever and hold it at either one side or the other of its movement, the said latch device having a notch at one end thereof, a secondary latch device having a projection to engage the aforesaid notch and formed with a cam surface adapted to be engaged by the lever in its movement and, when so engaged, to move the secondary latch device to release position, springs actuating the latch devices, film winding mechanism, and means actuated by the film winding mechanism for releasing the primary latch device.

17. A device of the character described comprising an oscillatory shutter control lever, a primary latch device having a projection adapted to extend on opposite sides of the shutter control lever and hold it at either one side or the other of its movement, the said latch device having a notch at one end thereof, a secondary latch device having a projection to engage the aforesaid notch and formed with a cam surface adapted to be engaged by the lever in its movement and, when so engaged, to move the secondary latch device to released position, springs actuating the latch device, film winding mechanism, and means actuated by the film winding mechanism for releasing the primary latch device, the said means including a cam operated by the film winding device, and a reciprocal member operated by the cam adapted to engage the primary latch device.

In witness whereof we have hereunto set our hands in the presence of a witness.

WILLIAM FRANCIS CUMNOR DEVLIN.
SIDNEY WALKER GRAHAM.

Witness:
RUSSEL S. SMART.